Figure 1:
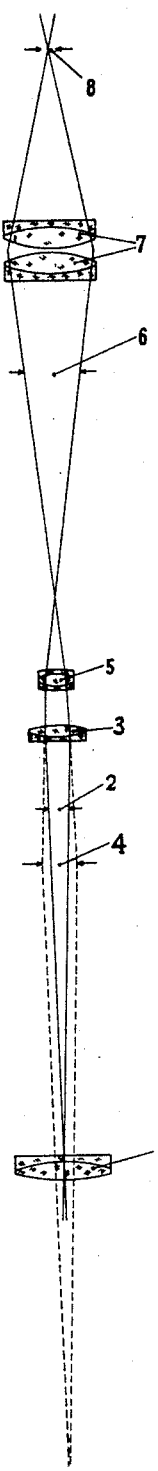

Aug. 14, 1923.

H. JACOB 1,464,655

SIGHTING TELESCOPE WITH CHANGEABLE MAGNIFYING POWER

Filed Aug. 9, 1921

Inventor:
Heinrich Jacob
by
Leo J. Matty
atty.

Patented Aug. 14, 1923.

1,464,655

UNITED STATES PATENT OFFICE.

HEINRICH JACOB, OF FRIEDENAU, NEAR BERLIN, GERMANY, ASSIGNOR TO THE FIRM OPTISCHE ANSTALT C. P. GOERZ AKTIENGESELLSCHAFT, OF FRIEDENAU, NEAR BERLIN, GERMANY.

SIGHTING TELESCOPE WITH CHANGEABLE MAGNIFYING POWER.

Application filed August 9, 1921. Serial No. 490,885.

(GRANTED UNDER THE PROVISIONS OF THE ACT OF MARCH 3, 1921, 41 STAT. L., 1313.)

*To all whom it may concern:*

Be it known that I, HEINRICH JACOB, a citizen of the German Republic, and resident of Friedenau, near Berlin, Germany, have invented certain new and useful Improvements in and Relating to Sighting Telescopes with Changeable Magnifying Power (for which I have made application for Letters Patent in Germany, June 11th, 1915; Austria, June 5th, 1920; Great Britain June 28th, 1920; and Czechoslovakia, July 7th, 1920), of which the following is a specification.

This invention relates to sighting telescopes in which the magnifying power is adjustable to either of two values.

In sighting telescopes for fire-arms, more particularly those for small arms the eye must be situated at a good distance from the eye piece lens in order to prevent the operator from being injured by the recoil of the gun, and all mechanical elements must be of simple construction. This results in difficulties in designing a sighting telescope with a changeable magnifying power when using adjustable reversing systems. If for instance the eye is to be about 8 cm. distant from the eye-piece, the eye-piece of a telescope with a lens reversing system must then have a focal length of practically 40 mm. in order to ensure a sufficient field of vision. If it is desired with such a telescope to change the magnifying power from 3 to 9 times by a simple change of the reproduction of the stationary object image with the use of only one adjustable reversing system, the equivalent focal length of the whole reproducing system which produces the image in the plane of the image of the eye piece, has to be changed from $40 \times 3 = 120$ to $40 \times 9 = 360$ mm. Assuming that only one reversing system with constant focal length is used and that the distance of the first and of the second image plane is invariable, such a change of magnifying could be obtained only by reducing the image produced by the object glass for the two adjustments to the same extent as the magnification. The high power in the case under consideration gives thrice the magnification of the low power. The object glass image must be therefore magnified or reduced $\sqrt{3} = 1.73$ times. It follows therefore that the focal length required for the object glass, is $120 \times 1.73 = 207$ mm. If it is considered that when magnifying 3 times the field of vision must be at least 15 meters at 100 meters, it follows that the diameter of the first image plane, that is to say of the diaphragm, must be 31 mm. But this dimension greatly exceeds the usual dimensions of sighting telescopes which, apart from the object glass casing, must not exceed an outside diameter of the tube of 30 mm. or a diaphragm of 18 mm.

Also the movement of the diaphragm with the sight required for the setting to varying elevation angles (distance setting), necessitates too much space to suit the great focal length.

The difficulty of arriving at dimensions admissible in practice with the use of only one adjustable reversing system, that is to say, with the mechanically simplest means, is surmounted according to the invention by using an object glass of the shortest possible focal length, for instance one with 120 mm. focal length, the image of which is in the first position of the adjustable reversing system reproduced in approximately natural size, and in the second position is magnified 3 times, in the scond image plane in front of the eye piece. According to this invention, this is rendered possible, in spite of using only one adjustable element of the reversing system, by the fact that instead of directly magnifying or reducing the image of the first image plane by the adjustable reversing system, a magnified virtual image of the said object glass image, moved towards the object glass, is projected by means of a stationary element of the reversing sytem, which virtual image corresponds to the above mentioned equivalent focal length of 207 mm. and is reproduced at the eye-piece focal distance by the adjustable part of the reversing system. For producing such a magnified virtual image between the image plane of the object glass and the object glass itself, it is necessary to insert a stationary or fixed positive lens system between the image plane of the object glass and the adjustable part of the reversing system.

This stationary or fixed element of the reversing system, in the case of high power, co-operates with the adjustable part and acts as a reversing system with a shortened focal length. But in view of the low power when the adjustable part of the reversing system is at a great distance, it does not reduce the focal length of the adjustable part of the reversing system to a material extent, so that a change of magnifying power becomes possible in the same way as it could be obtained with a fixed image distance only by means of a reversing system of variable focal length.

To be able to influence strongly the focal length of the reversing system, in order to obtain a sufficient magnifying of the object glass image, the fixed lens system must be moved to a considerable extent out from the image plane, in which it differs from a collective system and which at the same time, assuming a high power of magnifying, determines chromatic correction of the said lens system.

The optical arrangement of a telescope according to the invention, is illustrated by way of example in the accompanying drawing and will now be described.

Figure 2:
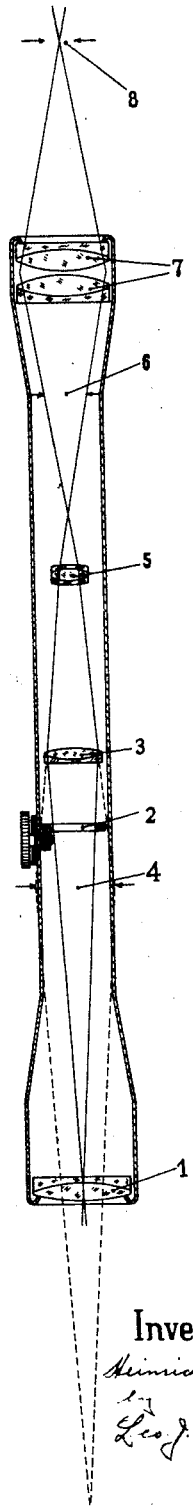

The object glass is marked 1, 2 is the image plane of the object glass, 3 is the fixed positive lens system for converting the object glass image appearing in the image plane 2, into a magnified virtual image in a plane 4 nearer the object glass 1. This system is shown in the drawing as a chromatically corrected lens, 5 is the adjustable part of the reversing system, which in Fig. 1 is in the position corresponding to high power magnifying, and in Fig. 2 in the position corresponding to low power magnifying or to the image in natural size relatively to the object glass image. 6 is the eye-piece image plane, 7 the eye-piece and 8 the plane of the eye.

The path of the rays indicated in the drawing shows the great change of magnifying that could be obtained by shifting the system 5.

When a real object glass image is to be magnified or reduced directly exclusively by the adjustable reversing system, that is to say, when the image in the plane 4 is a real object glass image, then, assuming that the above data apply, the object glass 1 will be at a distance of 207 mm. from the plane 4. The total length of the instrument would be therefore about 400 mm. as compared to a length of about 300 mm. for telescope according to the present invention. Moreover, the diaphragm carrying the sight, would require an inside diameter of 31 mm. as compared to a diameter of 18 mm. in the instrument according to the invention.

The data of construction of an embodiment of the invention are as follows:

*1. Magnifying power=4.*

Field of view: 11.2 for 100 meters corresponding to a diameter of the diaphragm =14.15.

Exit pupil about 10 mm.

Focal length of the object glass 1=126 mm; aperture 40 mm.

Focal length of the collecting system 3= 40 mm; aperture 13 mm; distance from the diaphragm=20 mm.

The virtual image 4 produced by the collecting system 3 has a distance of 40 mm. from system 3 and of 20 mm. from the diaphragm. The diameter of the image is 28.3 mm.

The focal length of the reversing system 5 is 30.9 mm; its distance from the virtual image 74 mm. The second image plane 6 has a diameter of 20 mm. and its distances from the virtual image and from the reversing system are 126.3 and 52.3 mm. respectively. The ocular 7 has a focal length of 45 mm. and a diameter of 34.5 mm.

The plane 8 of the eye of the observer has a distance of 77 mm. from the main plane of the outer ocular lens.

*2. Magnifying power=8.*

Field of view: 5.6 for 100 meters corresponding to a diameter of the diaphragm =7.67 mm.

Exit pupil about 5 mm.

The change in magnification is obtained by shifting the reversing system 5. The reversing system is approached to the collecting system 3 to such extent, that its distance from the virtual image is=52.3 mm. The virtual image 4 has then a diameter of 14.15 mm. The plane 8 of the eye of the observer has in this case a distance of 75 mm. from the main plane of the outer ocular lens.

What I claim is:

In a sighting telescope with distant eye point having at its opposite ends an object-glass and an eye piece respectively in combination a diaphragm in the image plane of the object-glass, said diaphragm carrying a transversely adjustable sight, a chromatically corrected collecting system arranged in fixed position at some distance from said diaphragm on the side opposite to the object-glass and an adjustable lens system between said fixed chromatically corrected collecting system and the ocular and forming together with the fixed chromatically corrected collecting system a reversing system, the fixed collecting element of the reversing system adapted to produce a magnified virtual image of the real image of the object-glass and of the diaphragm and sight in the object-glass image plane, and the shiftable element of the reversing system adapted as well to further magnify as to reduce said magnified virtual image produced by the fixed element depending from the distance of the two elements of the reversing system from each other.

In testimony whereof I have signed this specification in the presence of two subscribing witnesses.

HEINRICH JACOB.

Witnesses:
HERMANN REISING,
JOHANN KOYKOFF.